Feb. 10, 1970    D. R. PARKER    3,495,202
ELECTRICAL INDUCTION COILS AND THEIR MANUFACTURE
Original Filed Oct. 7, 1966    9 Sheets-Sheet 1

INVENTOR.
Delbert R. Parker
By
HIS ATTORNEYS

INVENTOR.
Delbert R. Parker
HIS ATTORNEYS

INVENTOR.
Delbert R. Parker

By
Green, McCallister & Miller
HIS ATTORNEYS

Feb. 10, 1970            D. R. PARKER            3,495,202
ELECTRICAL INDUCTION COILS AND THEIR MANUFACTURE
Original Filed Oct. 7, 1966            9 Sheets-Sheet 5

INVENTOR.
Delbert R. Parker
HIS ATTORNEYS

INVENTOR.
Delbert R. Parker
HIS ATTORNEYS

Feb. 10, 1970     D. R. PARKER     3,495,202
ELECTRICAL INDUCTION COILS AND THEIR MANUFACTURE
Original Filed Oct. 7, 1966     9 Sheets-Sheet 9
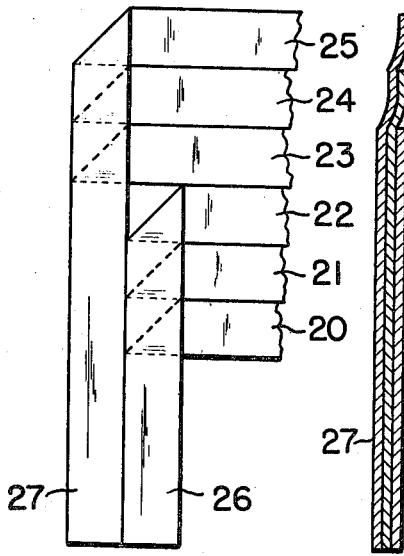
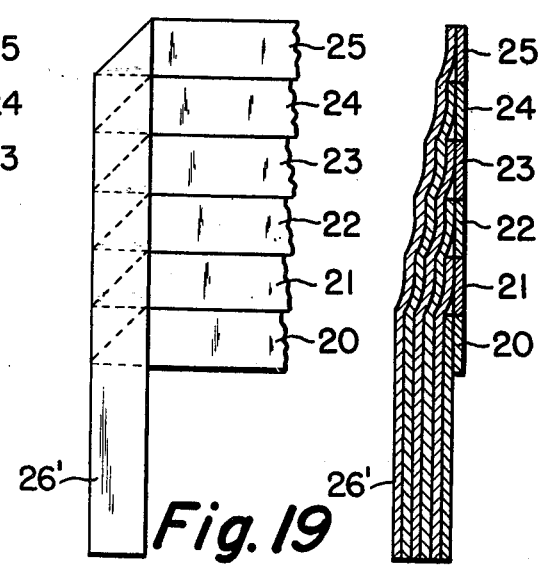
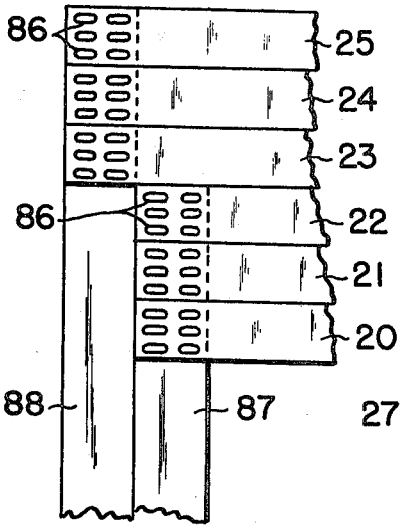
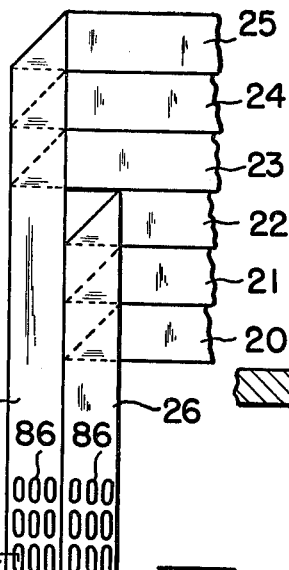
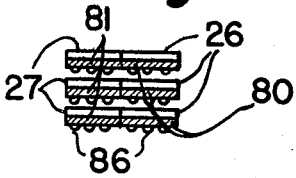
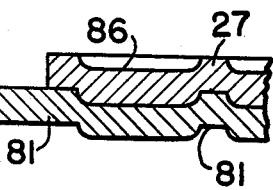
INVENTOR.
Delbert R. Parker
HIS ATTORNEYS United States Patent Office 3,495,202
Patented Feb. 10, 1970

3,495,202
ELECTRICAL INDUCTION COILS AND THEIR MANUFACTURE
Delbert R. Parker, Mount Pleasant, Pa., assignor to R. E. Uptegraff Manufacturing Company, Scottdale, Pa., a corporation of Pennsylvania
Original application Oct. 7, 1966, Ser. No. 585,032. Divided and this application Sept. 24, 1968, Ser. No. 762,078
Int. Cl. H01f 27/28, 15/10, 27/30
U.S. Cl. 336—186                 9 Claims

ABSTRACT OF THE DISCLOSURE

Bare, uninsulated, individual lengths of metal conductor ribbons of substantially rectangular section are assembled as a layer group or winding turn in an immediately adjacent edgewise relation on a supporting layer of insulating material and wound spirally with the insulating material to form a complete electrical winding. Each ribbon as wound represents an electrical series winding, with the only insulation being between spiral winding turns or layers, and with the inner and outer terminal ends of each series circuit representing each ribbon being connected in parallel to the remaining ribbons of the group to provide an electrically parallel circuit from the standpoint of the opposite ends of the windings. The insulating material extends transversely beyond the side edges of the outer ribbons of the group and are of thickened section thereat that substantially corresponds to the thickness of the ribbons. Requirements of cross section for each ribbon length are met by varying the width thereof within limits and also, by placing ribbon lengths of the layers or winding turns in a face-to-face abutting sandwich relation.

---

This invention relates to windings for electrical apparatus and particularly, to electrical coil windings for induction equipment, such as electrical transformers. A phase of the invention deals with procedure for forming and means for providing an improved and more versatile winding construction for electrical transformers.

This is a division of my copending application Ser. No. 585,032, filed Oct. 7, 1966 and entitled "Electrical Induction Coils And Their Manufacture."

Heretofore, in forming or making electrical induction windings, it has been customary to either use so-called magna or insulated wire that is wound helically as a coil or to use a wide sheet of a suitable metal, such as aluminum or copper, as a full transverse width of coil winding. Although a magna winding is more adaptable from the standpoint of obtaining a desired capacity of the transformer for meeting its current-carrying and voltage requirements, it has a number of disadvantages, including high cost, the tendency of inner portions of the coil to spread transversely-outwardly in the event of a short circuit, multiple complexity of its structure, etc. On the other hand, a coil winding of flat metal sheet, by reason of its unitary width nature, has no tendency to spread transversely under short circuit, requires less insulation, is stronger, and is much less complex in its wound structure. It also facilitates a simple and direct winding operation. It, however, has a great disadvantage of lack of flexibility or versatility in meeting different capacity needs of individual transformer constructions. That is, the use of a sheet construction necessitates a large stock of expensive sheet metal material, in order to meet requirements for various transformer capacities. Sheet coils of various thicknesses as well as various widths must be provided. This necessitates an extensive and expensive inventory which not only leads to stocking problems, but requires a large amount of plant space.

The present invention deals with a new approach to an electrical winding which eliminates the need for separately insulated strands, as in the case of a wire wound coil, which will closely approach the mechanical strength of a sheet wound coil and its other advantageous features, but will have a versatility or flexibility in meeting various transformer requirements that is entirely lacking as to the sheet wound type. In other words, the invention, in effect, incorporates the advantageous features of the two old types of windings, without their inherent disadvantageous features.

It has thus been an object of the invention to devise a transformed winding or coil construction that will obviate the adverse factors heretofore present in constructions of the magna wire or sheet metal types and that will fully meet the problem involved;

Another object of the invention has been to devise a metal ribbon type of winding construction and to provide a practical method of utilizing such ribbon material in forming an electrical winding.

Another object of the invention has been to develop a new and improved electric winding construction which is versatile from the standpoint of the need for only a minimum of width and thickness ranges of metal conductor supply stock, as in the form of reels or coils, for meeting a wide range of capacity requirements;

A further object of the invention has been to devise new and improved procedure for forming an electrical induction coil or transformer winding which will enable the simultaneous utilization of a group of plurality of metal ribbon lengths or strands;

A still further object of the invention has been to provide a transformer winding construction that will enable the smaller shops to successfully compete with larger production shops in the manufacture of electric equipment of a wide range of sizes or capacities.

These and other objects will appear to those skilled in the art from the illustrated embodiment and the claims.

In the drawings, FIGURE 1 is a side view in elevation illustrating an apparatus layout as utilized for forming electrical induction or transformer coils in accordance with the invention; in this figure, the apparatus is being used to apply a single thickness layer of metal conductor ribbon;

Figure 10:
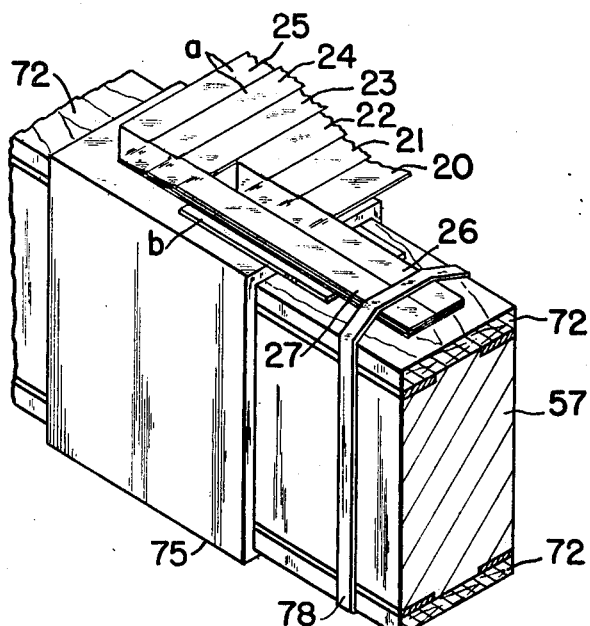
FIGURE 10 is a fragmental isometric view in elevation taken through a winding mandrel shown in the left hand portion of FIGURES 1, 2 and 3 and on an enlarged scale with respect to such figures to illustrate the starting of a winding operation.
Figure 12:
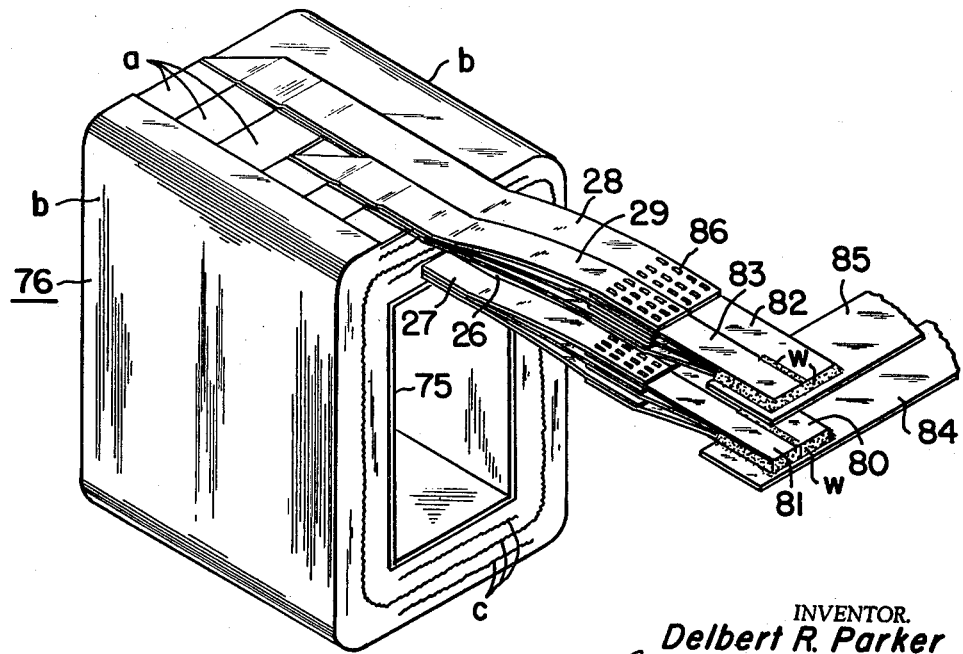
Figure 11:
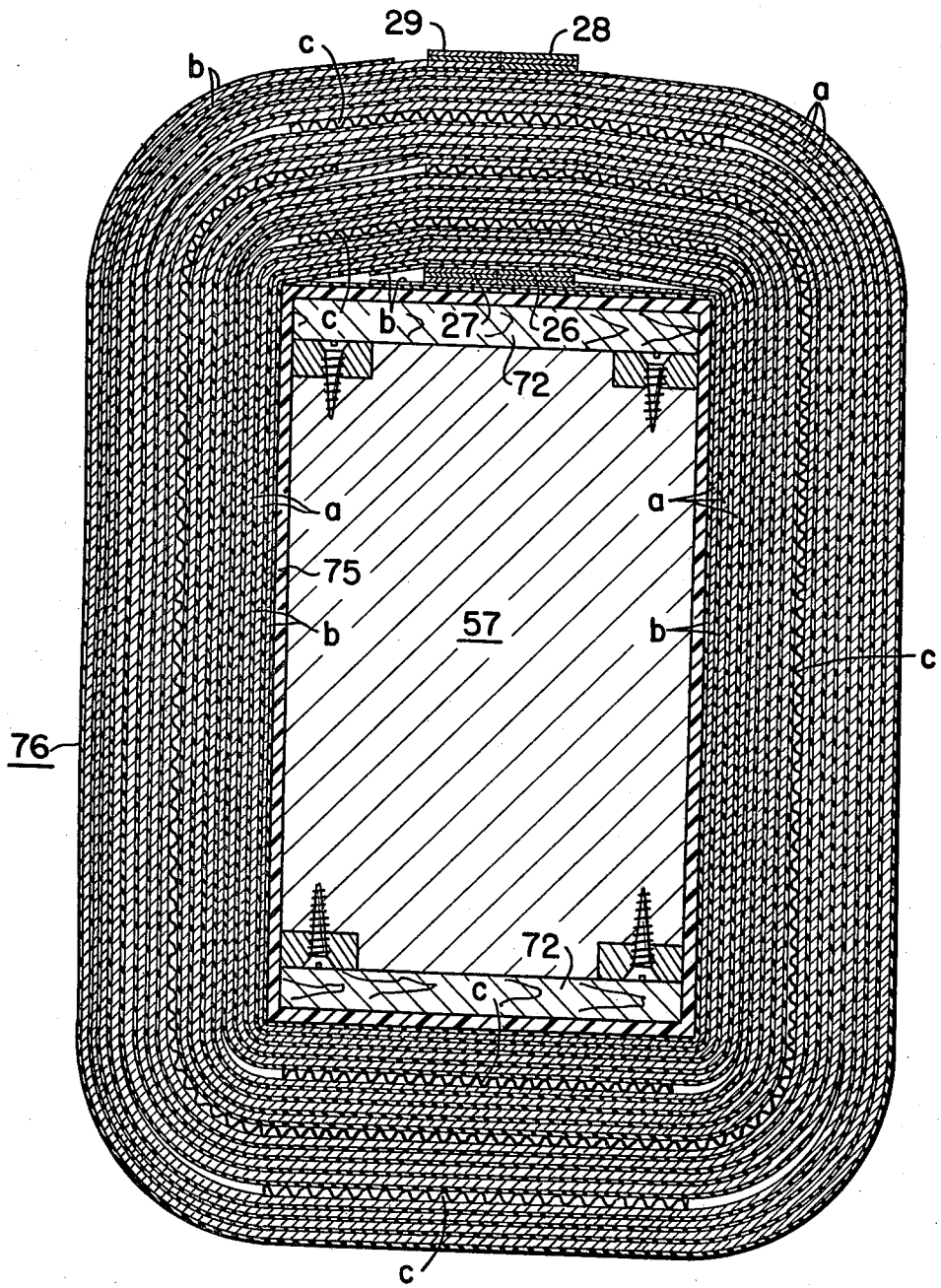
Figure 14:
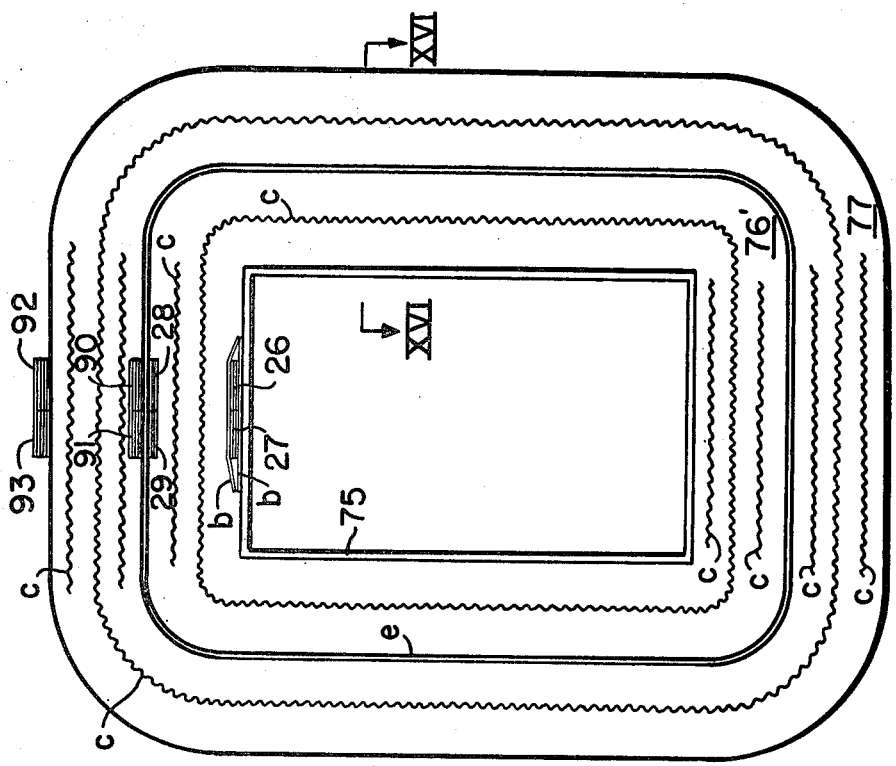
Figure 13:
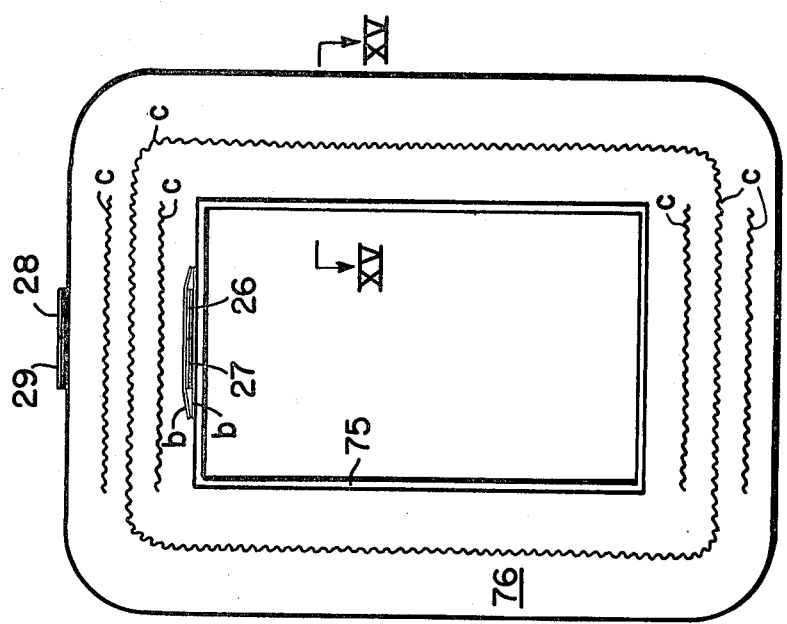
Figure 15:
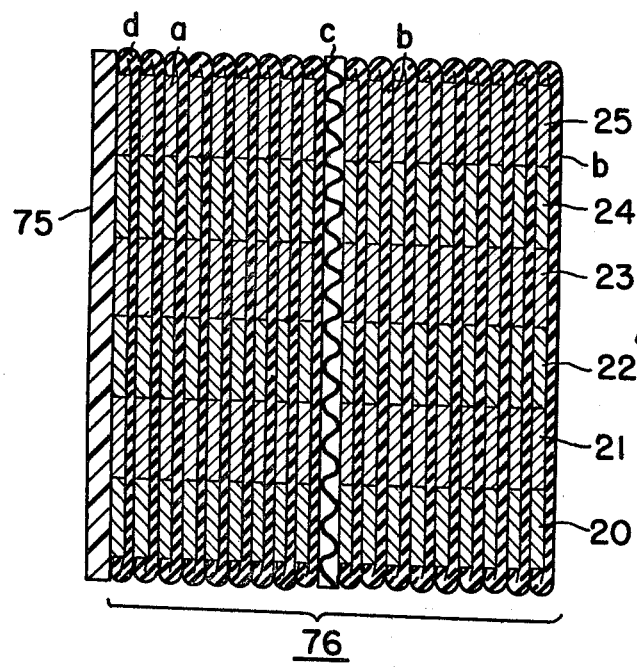
Figure 16:
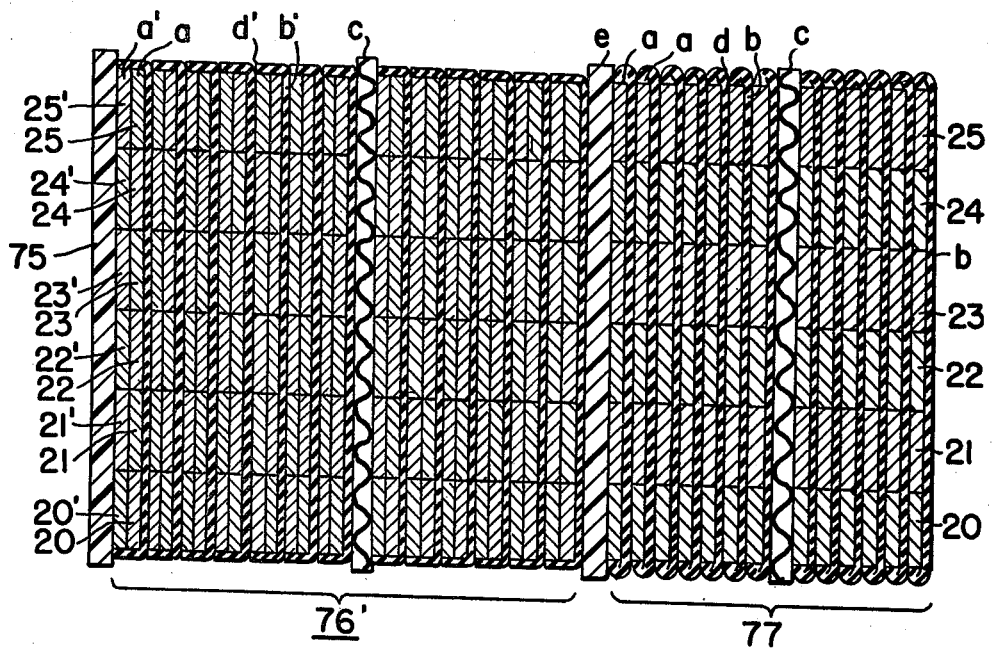

FIGURE 11 is a greatly enlarged fragmental end section in elevation illustrating the substantial completion of the forming of a low voltage winding or coil on a mandrel, as started in a manner illustrated in FIGURE 10; this view also illustrates the provision of air space defining corrugated insulating sheets or pieces and the same types of lead-out connector tabs from the inside of the winding as illustrated in FIGURE 10;

FIGURE 12 is an isometric view in elevation on the scale of FIGURE 10, illustrating a completed low voltage coil or winding and further illustrating the employment of conductor tab connectors of the type of FIGURES 10, 11, 18 and 19 for starting and terminating ends of the coil and their connection with input and output electrical bus bars, where end portions of the coil are of a metal such as aluminum and the bus bars are of the usual copper metal;

FIGURE 13 is a cross section through a completed low voltage coil or winding and FIGURE 14 is a similar view through completed low and high voltage coils or windings of an inductive transformer; both views are on the same enlarged scale with respect to FIGURE 12 and illustrate single layer conductor ribbon windings;

FIGURE 15 is a horizontal section on an enlarged scale with respect to and taken along the line XV—XV of FIGURE 13 showing a low voltage coil of a single thickness layer of conductor ribbon;

FIGURE 16 is a horizontal section on the scale of FIGURE 15 and taken in the direction of line XVI—XVI of FIGURE 14, showing a low voltage coil having a double thickness or stacked conductor ribbons in its conductor layers and a high voltage coil having a single thickness or member layer;

FIGURE 17 is an enlarged fragmental detail illustrating one type of integral lead-out connector tab assembly for starting and terminating end portions of the windings of an induction coil constructed in accordance with the invention;

FIGURE 18 is a section on the scale of and taken along the line XVIII—XVIII of FIGURE 17;

FIGURE 19 is a view on the scale of and similar to FIGURE 17 illustrating another type of integral lead-out tab connector assembly;

FIGURE 20 is a sectional view on the scale of and taken along the line XX—XX of FIGURE 19;

FIGURE 21 is a fragmental detail on the scale of FIGURES 17 to 20 showing a type of tab connection assembly that makes use of copper extension tabs or connector pieces (assuming an aluminum ribbon winding is used) and that employs internal connections or joints between conductor ribbon end portions of the coil and the copper extension pieces;

FIGURE 22 is a fragmental detail on the scale of FIGURE 21 illustrating an external type of connector assembly also using copper extension tabs or connector pieces with a coil having aluminum conductor ribbons; this view further illustrates how the copper extension pieces are employed to electrically-connect all the ribbon end portions of a layer of the coil in parallel and to a common copper bus bar;

FIGURE 23 is an enlarged sectional fragment in elevation taken along the line XXIII—XXIII of FIGURE 22, but showing only one integral tab of one conductor ribbon group and its connection or joint with an associated extension piece of an associated copper group;

And, FIGURE 24 is a view on the scale of and along the line XXIV—XXIV of FIGURE 22 showing connections or joints between all members of one aluminum connector tab group and associated members of copper extension pieces of the associated copper group; the connected members are shown slightly moved apart from their stacked relation to better illustrate the joints or connections.

In carrying out the invention, use is made of relatively thin, continuous-length, flat or planar, bare metal ribbons or strips, such as of aluminum or copper, and preferably of the former, in view of the scarcity and cost of the latter. A group or plurality of the metal ribbons are simultaneously fed, advanced or pulled, somewhat loosely, endwise-forwardly in a spaced side-by-side relation from individual coils positioned on payout means and are then moved, drawn or pulled uniformly or, at the same speed, in a positively guided-tensioned and edgewise-close relation upon a form positioned on a winding mandrel. At the mandrel, the group of side-by-side positioned metal ribbons are progressively applied in a side-by-side edgewise noninsulated relation, preferably adhesively to a full width, supporting, insulating sheet of material to form a composite length that is wound spirally on the mandrel to complete the coil or winding. In accordance with the inventive concept, there is no need for either insulating the edges of the adjacent ribbons or strips of a given width layer, turn or convolution with respect to each other or of maintaining them in electrical contact with respect to each other along the winding.

In this connection, by way of example, if the desired widthwise extent of layers of the winding is to be twelve inches and individual metal ribbons of two inches in width are to be used, six ribbons are advanced in a substantially planar, side-by-side relationship. The ribbons of each layer for example, the six ribbons, are wound spirally and are all employed in a parallel electrical relationship. The parallel relation is effectively provided by securely connecting the end portions of each ribbon of the layers or turns at the starting and terminating ends of the winding or coil electrically with each other. The integral end portions of the conductor ribbons, in the preferred construction, extend transversely outwardly of the winding or coil to enable external splices and connections. There is no waste as in the case of a full width metal sheet, where it is necessary to cut-off a portion of the starting and terminating ends of the sheet winding to provide electrical connector tabs.

It has been found to be important to prevent damage to the edges of the adjacent metal ribbons as they are being fed to the winding mandrel, particularly due to the fact that their thicknesses may be very slight. However, it was discovered how the conductor ribbons can be taken off payout coils of different diameters and how space factors can be maintained very efficiently without damaging the adjacent edges of the ribbons used in the construction. It is now possible to provide, for example, a thousand different capacities of electrical transformers utilizing strips of only nine different thicknesses and of, for example, the same individual widths. In this connection, there is great flexibility, both from the standpoint of the width factor (as distinguished from the use of a metal sheet), but also from the standpoint of the thickness factor. That is, ribbons of the layers (such as the outer ribbon lengths) may have a different or greater thickness than other ribbon lengths of the layers. Also, outer side ribbons of the winding may have a plural thickness as wound and inner ribbons may have a single thickness, or all of the layers may have a dual thickness as wound to provide any desired cross-sectional area. In a stacked or dual thickness of ribbon winding, the operation is substantially the same, except that one particular length of a ribbon group line will carry two or more ribbon lengths in a face-to-face abutting relation for winding on the coil mandrel.

From a mechanical standpoint, the load is distributed through the full width extent of each layer, the same as in a solid sheet construction and, in the event of a short circuit, it has been determined that the metal ribbons do not tend to move outwardly, as in the case of a helically-wound magna wire coil. The ribbons, themselves, form end connection tabs at the beginning and end of each winding; each tab may be bent at right angles to its ribbon length to extend outwardly from the winding. It has been found that outside connections are preferable from the standpoint of maintenance and repair, and that they facilitate efficient electrical connections to bus bars. For example, if the ribbon winding of a coil is of aluminum, connector tabs may be provided by bending all the ribbons of, for example, the inner or starting layer, outwardly along a transverse line, so that all or groups of the tabs of the layer are in face-to-face alignment and each tab group of the layer may then be suitable electrically-connected, as by a pressure deforming method or by a heliarc weld, to copper tabs that are brazed to a bus bar. The coil or winding, in effect, consists of a plurality of separate series circuits (representing each ribbon length) that are connected in parallel at their ends.

The invention also facilitates the use of corrugated spacer sheets or pieces of insulating meterial at suitable locations along the winding, so as to provide efficient air-cooling in a dry type of transformer or efficient circulation of oil in a wet type of transformer.

Any suitable width of the winding may be provided in accordance with the invention. For example, twenty inch widths have been successfully employed without any difficulty, using ten, two-inch ribbons. The effective range of ribbon size width is about one-half to four inches with an optimum of about one to two inches. The maximum thickness of the ribbon should be below about one-half of an inch, and can be effectively of a thin thickness (approaching metal foil) that will provide the minimum tension strength required for the winding procedure. For example, down to about .021 of a ninch thickness has been successfully utilized. The cost of a spiral ribbon winding in accordance with the invention is about one-third that of the cost of a magna wire helically wound winding.

As illustrated, the continuous length of insulation material has a greater width than the combined width of the group of metal ribbons placed thereon, and the extending side edges of the material have a greater thickness than the central portion thereof which supports the metal ribbon group. The thickness of the side edge portions may correspond to the thickness of the supported layer of metal ribbons. Although a winding of the invention is particularly suitable as a low voltage winding of a transformer, it may also be used for providing a high voltage winding.

Figure 1:
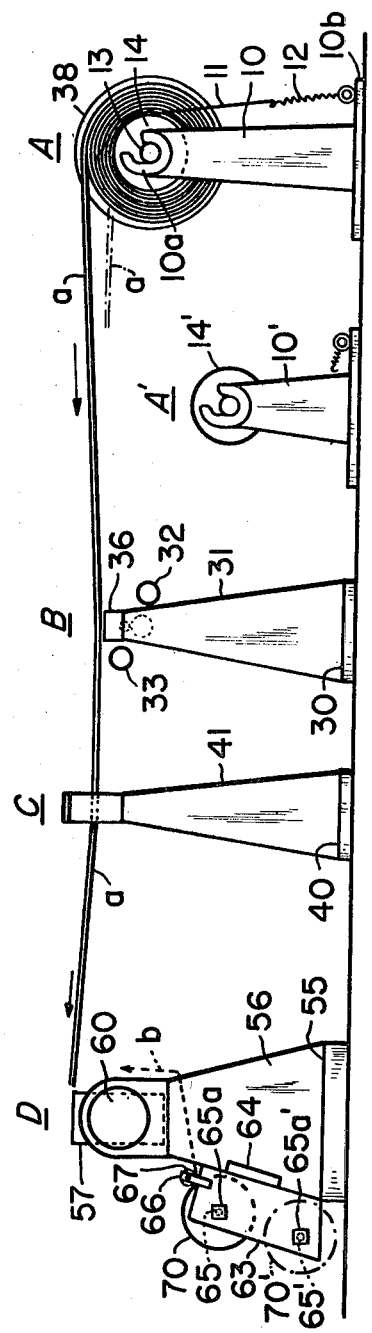
Figure 2:
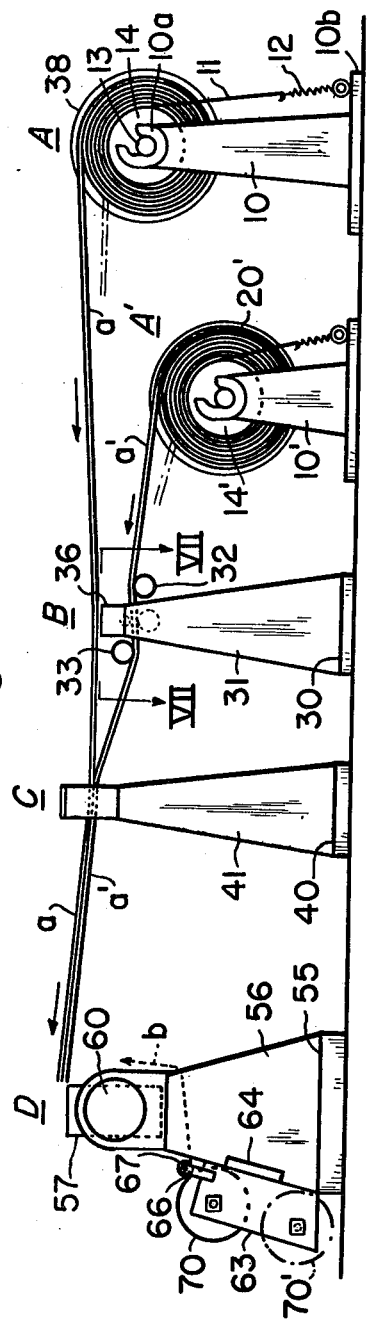
FIGURE 2 is a view similar to and on the same scale as FIGURE 1 showing an apparatus layout as utilized in providing at least one dual thickness or stacked group of ribbons for conductor layers of an electrical coil being wound.
Figure 3:
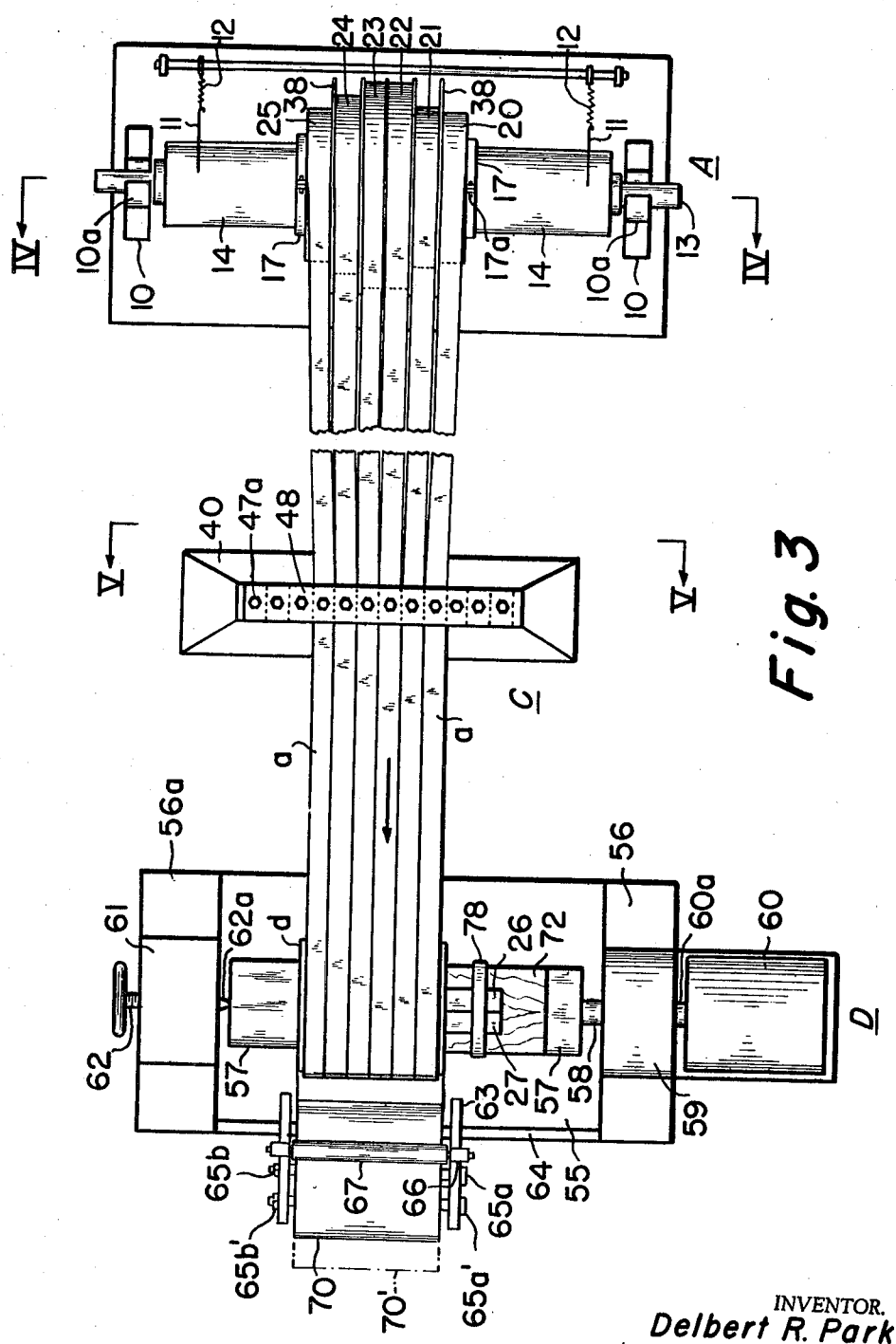
FIGURE 3 is a top plan view on a slightly enlarged scale with respect to FIGURES 1 and 2 illustrating the system of such figures, but broken-away to omit a second payout unit and an adhesive applicator unit of such figures.

Referring particularly to FIGURES 1 to 3, inclusive, I have shown an apparatus layout or system for winding an electrical induction coil in accordance with my invention. FIGURE 1 illustrates the winding of a single conductor layer and FIGURE 2 illustrates the winding of a dual member thickness or stacked group of conductor ribbons which may be used to provide a full width dual layer or at least one dual or stacked ribbon group length in a conductor layer. As illustrated, a primary conductor ribbon payout unit A is provided for supping continuous lengths of metal conductor ribbons 20 to 25 as a conductor layer $a$ from a group or plurality of payout coils or supply reels, shown in FIGURES 3 and 4. The unit A and the subsequent units of the system or layout are constructed to utilize payout coils which, as illustrated, may be of different diameters or, in other words, have different amounts of ribbon used therefrom. This permits maximum flexibility of the apparatus to make use of different sizes of coils and of coil remnants. Although different coil sizes will normally supply ribbon lengths at different rates, tension-guide means is provided for assuring a uniform speed of the individual lengths to and upon the winding form. When one coil has been exhausted, it is a simple matter to braze or weld the terminating end of one ribbon length to the starting end of a new ribbon coil of the same base metal and size.

The primary payout unit A is employed for providing a single conductor layer $a$ of a group of edgewise-adjacent and as fed or pulled-out, slightly spaced-apart (see FIGURE 3) individual ribbons (see 20 to 25) from the group of coils or reels to an aligning and tensioning unit C and from such unit in a close, edgewise-adjacent relation as a continuous group length for winding on a form 75 that is rotated by coil winding unit D. Incidentally, for simplicity of illustration, the payout coils and their respective individual conductor ribbon lengths which are of flat, relatively-thin thickness have been given the same reference numerals in the drawings. If at least one dual ribbon, stacked length or group is to be provided, then a similar secondary payout unit A' may be employed with an adhesive applicator unit B, in order to supply one or more continuous conductor ribbon lengths as a second layer $a'$ in a stacked and adhesively-secured relation to an under side of an aligned conductor ribbon or ribbons of the upper layer $a$ through the aligning and tensioning unit C to the winding unit D. Since the secondary unit A' is of the same construction as the primary unit A, its parts have been designated by the same reference numerals, but with prime affixes, and a description of the details for the primary unit A will suffice for both units.

Figure 4:
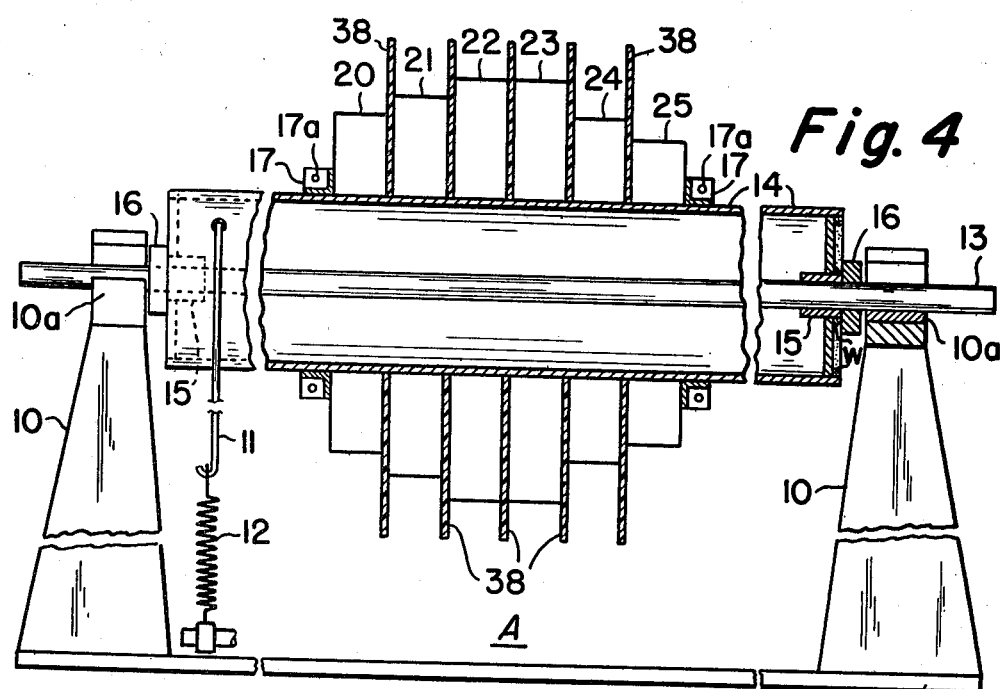
FIGURE 4 is a further enlarged vertical section in elevation taken along the line IV—IV of FIGURE 3 and showing details of a payout drum and the operative mounting of conductor ribbon payout coils or supply reels thereon; this view is partially broken away through the drum.

As shown particularly in FIGURES 3 and 4, the payout unit A has an opposed, transversely spaced-apart pair of upright stands 10 that are supported on a common base 10b, and that are provided (as also shown in FIGURES 1 and 2) with slotted upper mounting portions 10a to removably-receive a transverse payout coil supporting shaft 13 therein. A cylindrical positioning and payout drum 14 for the conductor ribbon coils extends along the shaft 13 and is rotatably-carried thereon by bearing sleeves 15 at its ends. Spacers 16 are shown interposed between the ends of the drum 14 and the mount portions 10a to centrally-locate the drum 14 in position therebetween. A pair of tie rods 11 are secured at their upper ends to the drum 14 adjacent its opposite ends. The lower end of each tie rod 11 is of hook shape to engage an upper end of a spiral tension or expansion spring 12 which, at its lower end, is secured to the base 10b. As a result, the ties 11 and their associated springs 12 resiliently or flexibly-restrain relative rotation of the payout cylinder 14, but serve to permit a releasing type of rotation if, for example, one of the payout coils tends to bind on the cylinder 14 during the payout of a conductor ribbon length therefrom.

The conductor ribbon lengths may, in accordance with the invention, be utilized as bare lengths of a suitable conductor metal, such as of copper or aluminum. In this connection, my invention makes practical the use of more readily available and less expensive aluminum metal ribbons in providing induction coils or windings for electrical transformers and the like.

Payout coils or supply reels for the ribbon lengths 20 to 25 are adapted to be slid endwise on the cylinder 14 which is of slightly smaller diameter than the inner diameters of the coils, so that the coils may individually rotate thereon. Suitable slide-on spaced discs 38 which may be of thin resin material, are shown provided for separating and spacing each payout coil with respect to adjacent coils and for protecting the edges of the metal conductor ribbons during the payout or feeding operation. The assembly of the conductor ribbon payout coils and the spacers 38 is removably-held in position on the drum 14 by split sleeve collars 17 which, at their split ends, are removably-clamped in position on the drum 14 by bolt and nut assemblies 17a. It will thus be apparent that the entire drum assembly, including its shaft 13 and the coils thereon, may be readily removed from the stands 10 by lifting the assembly as a unit upwardly and backwardly through the openings in the mounting portions 10a. For inserting a new payout coil, the shaft 13 may be pivoted in one mounting portion 10a and removed from the other or opposite mounting portion 10a. It will be apparent that the width and number of the payout coils may be varied as desired for providing suitable electrical characteristics of the spiral winding which is to be produced.

Figure 8:
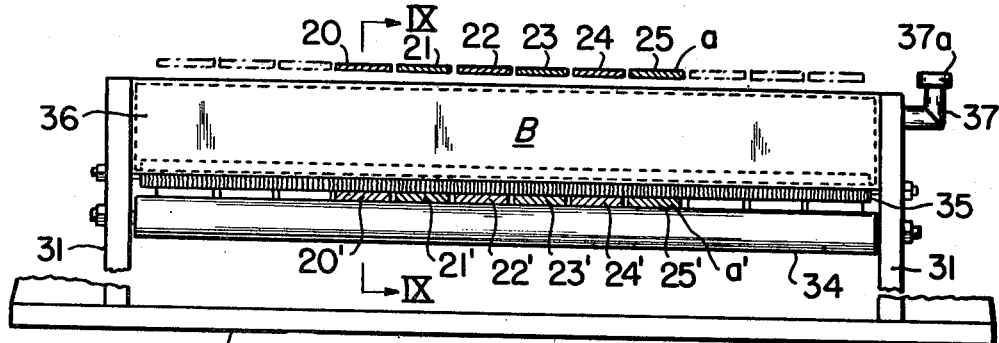
FIGURE 8 is a fragmental transverse end view in elevation on the scale of and taken along the line VIII—VIII of FIGURE 7.
Figure 9:
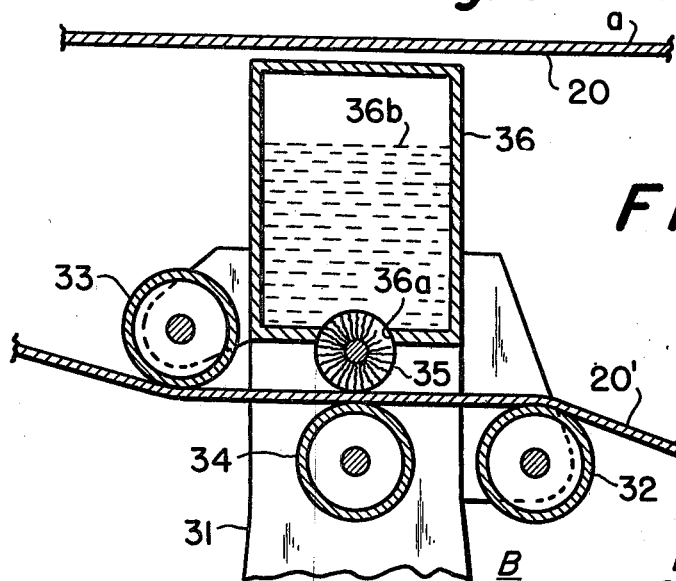
FIGURE 9 is a fragmental side section in elevation taken along the line IX—IX of FIGURE 8 and on an enlarged scale with respect thereto.

When the secondary payout unit A' is to be used, adhesive applicator unit B may be employed for applying adhesive to the upper side of ribbon lengths, such as 20' to 25' as they issue from the secondary unit A', in a manner illustrated particularly in FIGURES 2, 7, 8 and 9. For the purpose of illustration, FIGURE 8 shows a complete secondary layer of conductors a', as supplied by the secondary unit A' and from its payout coils. It will be noted that the conductor ribbons 20' to 25' of the secondary unit A, are preferably supplied in the same widths as the upper layer a and in a face-to-face aligned relation with respect to corresponding ribbon lengths of the upper layer a.

The unit B has a pair of upwardly-projecting, transversely spaced-apart stands or legs 31 mounted on a common base 30 and provided with a lower, back-positioned, transversely-extending guide roller 32, and an upper, forwardly-positioned, transversely-extending guide roller 33 for guiding bare metal conductor ribbons of the layer a' through an adhesive applicator pass defined between a transverse, lower contact roller 34 and an upper, adhesive-applicator, transversely-extending roller 35. The roller 35 serves as a brush and may be of any suitable material, such as brush hairs, felt, etc. This enables any ribbon length supplied by the secondary unit A' to be provided with a uniform layer of a suitable adhesive on its upper face, so that it may then be secured in a flat face-to-face, stacked-aligned relation with an associated ribbon length of the upper layer a. A transversely-extending container, header or reservoir 36 is mounted between the upright stands 31 and carries a quantity of fluid or liquid adhesive 36b therein for supplying the adhesive through a transverse bottom slot or opening 36a to the applicator roller 35 as it rotates. As shown particularly in FIGURES 7 and 8, the reservoir or container 36 may be provided with a filler neck 37 projecting from one end thereof and closed-off by a removable closure cap 37a.

Figure 5:
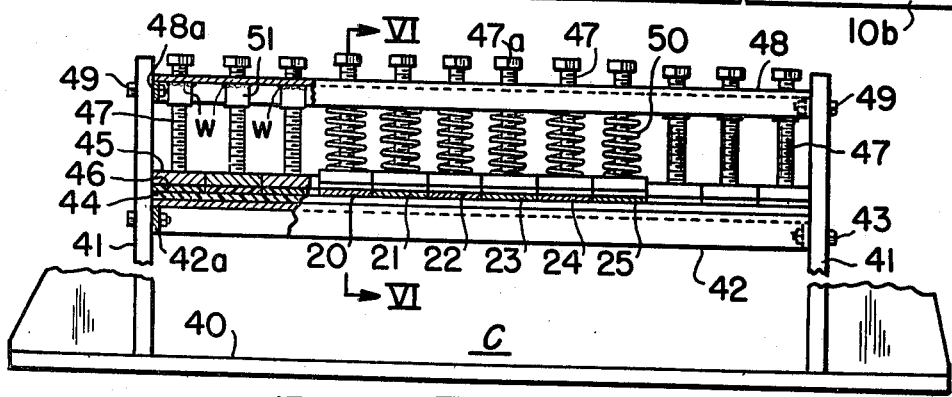
FIGURE 5 is a fragmental transverse view in elevation, partially in section, on the scale of FIGURE 4 and taken along the line V—V of FIGURE 3.
Figure 6:
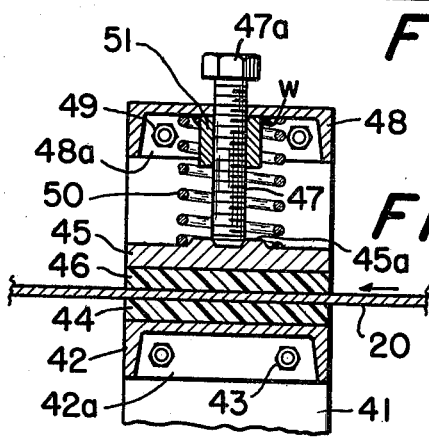
FIGURE 6 is a side fragmental section in elevation on an enlarged scale with respect to and taken along the line VI—VI of FIGURE 5.
Figure 7:
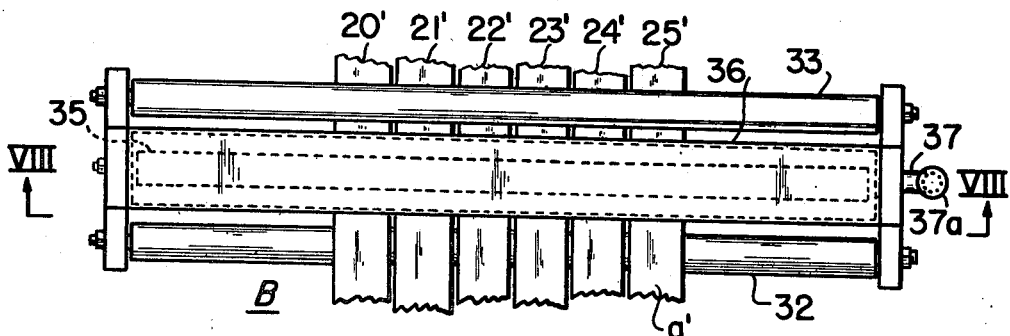
FIGURE 7 is an enlarged fragmental top plan view on the scale of FIGURE 5, taken along the line VII—VII of FIGURE 2.

A suitable construction of aligning, guiding, tensioning unit C is illustrated particularly in FIGURES 3, 5 and 6 of the drawings. This unit has a pair of transversely spaced-apart upright stands or legs 41 that are mounted on a common base 40. A bottom, transversely-extending, channel-shaped, lower support metal member 42 is shown secured between the legs 41 at its flanged end portions 42a by bolt and nut assemblies 43 to provide a substantially planar support face by means of its web portion. A resin, transversely-extending, planar contact pad 44 may be cemented to the upper planar face of the support member 42 to define one side of a pass through which the ribbon lengths move. An upper, transversely or cross-extending, channel-shaped, metal support member 48 is secured in an upwardly-spaced relation with respect to the bottom member 42 by bolt and nut assemblies 49 which extend through its closed or flanged end portions 48a. The upper support member 48 serves as a support for upper, pressure-applying means which may, as shown comprise individual metal pressure plates 45 and cemented-on, individual, planar, resin pressure contact pads 46. The width of the plates 45 and pads 46 may correspond to the width of an individual ribbon length which is to be moved through the pass represented by the lower pad 44 and the individual upper pads 46. It will be apparent that different sizes of plates 45 and pads 46 may be provided for different widths of ribbons. Although a full length upper plate and resin pad may be used, I prefer individual pads in order to individually adjust the guided tension of each conductor ribbon as it is drawn from its respective payout coil. The opposed pads 44 and 46 prevent damage to the ribbons during their frictional passage therebetween and may be of any suitable material, such as a polyethylene resin.

As illustrated particularly in FIGURE 6, each pressure plate 45 and its associated resin pad 46 is adjusted by means of a bolt, threaded stud or stem 47 that has a wrench flat head portion 47a and a screw fit within an internally-threaded extension sleeve or nut 51. As shown in FIGURE 6, the sleeve or nut 51 is weld-secured at w to the under side of the web of the upper cross-extending support member 48. The stud 47, at its lower tapered end, has an aligned, friction-fit with a central depression of a mounting portion 45a on the upper face of the associated pressure plate 45. A spiral expansion spring 50 surrounds the stud 17; at its uper end, it engages the under side of the upper support member 48 and, at its lower end, engages centrally about the mounting portion 45a. Each spring 50 is adapted to resiliently-urge the associated individual plate 45 and its resin pad 46 into tension-engagement with the upper side of a particular conductor ribbon length or stacked group that is being pulled under tension through the pass defined by the upper and lower pads 46 and 44. The wrench flat head 47a is employed to adjust the movement-permitting relationship between the upper support 48 and its associated individual pressure plate 45 or, in other words, to adjust the spring action or tension as applied to the associated resin pad 46.

As illustrated particularly in FIGURES 1, 2, 3, 10 and 11, the winding unit D may be of lathe type having a pair of transversely spaced-apart upright stands 56 and 56a mounted on a common base 55. A mandrel or rotative member 57 is provided of the generally desired shape of the coil or winding to be produced, and may be driven at one end through the agency of an electric motor 60, a motor drive shaft 60a, a gear reduction unit 59 and an output drive shaft 58, all mounted on the upright stand 56. As shown in FIGURE 3, drive shaft 58 extends from the gear reduction unit 59 and is centrally-secured to the mandrel 72 for rotating it. The other end of the mandrel 57 is centrally-rotatably carried on a pivot end 62a of a threaded lathe screw 62 that is adjustably-carried by a mount 61 on the other stand or upright support 56a.

As illustrated particularly in FIGURES 10 and 12, a starting insulating form 75 of resin or impregnated cardboard, etc., may be provided of rectangular shape whose window or opening substantially corresponds in dimension to the shape of the mandrel 57 and which, in the completed coil or winding, is adapted to receive a metal core (such as of iron). The form 75 may be initially slid endwise on the mandrel 57 from its non-driven end and then removably-secured by endwise-removable, resin or wood top and bottom pieces 47 so as to permit their knock-out for easy removal of the form when the winding or coil has been completed. The start of the winding may be accomplished by first providing the necessary connector tabs or lead-out connections from each individual connector ribbon of the first layer, as illustrated in FIGURES 10 and 12. Such leads may be in various forms, as further illustrated in detail in FIGURES 17 to 24, but will preferably be in the form of fold-over end portions of the respective conductor ribbons of the layer.

By way of illustration, in FIGURES 10 to 12, an oblique fold is made of an integral end portion of each conductor ribbon of the starting layer for three adjacent ribbons and such folded-over portions extend at right angles to the layer, outwardly of the winding, as aligned-stacks, face-to-face sets or groups. In these figures, the starting connector tabs are in two groups 26 and 27, each using three adjacent ribbons of the six ribbon layer, with one group or stack in an offset relation with the other, longitudinally of the ribbon layer a. To hold the starting connector, stacked tab groups 26 and 27 in position, a tape 78 may be wound about the mandrel 57, as particularly illustrated in FIGURE 10, and may be later removed when the winding is completed.

For supplying an insulating layer or barrier between the layers or turns of conductor ribbons, the winding unit D is shown provided with a means for feeding a continuous length of sheet insulating material b, such as of paper, cardboard or a suitably treated fabric, from one of either payout coil 70 or 70', see particularly FIGURES 1, 2 and 3. The insulating sheet b may be impregnated with a suitable adhesive, such as a thermosetting resin, shellac, etc. Although the adhesive may be supplied during the winding operation, I prefer to employ previously impregnated coils or reels 70 and 70'. The use of fully impregnated insulating sheet material b tends to eliminate air spaces and bubbles and, in a wet transformer, precludes oil absorption.

A chute or channel-shaped mounting member or support 63 is shown secured on a cross-connecting member 64 between the uprights or stands 56 and 56a so as to project forwardly from the unit D in substantial alignment with the form 75. The supporting or mounting member 63 is provided with vertically spaced-apart cross shafts 65 and 65' for removably-rotatably carrying insulating material payout coils or reels 70 and 70'.

In FIGURES 1 and 2, the payout coil 70 is shown in an operating position and the coil 70' is shown in a back-up, reserved position for supplying continuous lengths of insulating material b to the winding unit D. Insulating length b is fed under a cross-extending guide and tensioning roller 66 whose shaft ends are rotatably-carried by the member 63. If desired, a roller pass may be used to increase the feed tension above drag-out tension. The length of insulating material b may be fed as an intermediate layer to the form 75 on the mandrel 57 so as to provide an insulating separating medium between spiral turns of the conductor layer a or plural layer a and a' of the winding until the coil is completed.

For the purpose of providing passageways for circulation of cooling air, fluid or oil, the winding is shown provided with corrugated insulating layers or portions c which may be inserted by the operator from time to time as the winding operation progresses. Any conventional means such as spacers, strips, etc. may be used.

Assuming that the first or low voltage winding or coil 76 has been completed, the terminating or outer ends of its last turn or layer are then provided with conductor lead groups or aligned stacks 28 and 29, see FIGURES 12 and 13, in a manner similar to the starting or inner lead groups 26 and 27. It must be emphasized that the integral leads at the starting and terminating end portions of the winding or coil are, in accordance with the invention, electrically-connected in parallel to individual input and output common bus bars (such as 84 and 85) which are ordinarily of copper metal. This eliminates the necessity for any worry about assuring efficient electrical connection between the individual members of the series turns or layers of the group of conductor ribbons of the coil, itself, and further eliminates any need for attempting to provide the ribbon lengths with individual insulation with respect to the other ribbons of the same layer. Also, an adhesive may be used between stacked ribbons of plural conductor turns or layers a and a', produced in accordance with procedure of FIGURE 2, without any worry as to lack of efficient electrical contact between the stacked ribbon layers where, for example, electrical characteristics desired in the transformer require the use of one or more stacked ribbons for each turn or layer of the winding.

Enlarged FIGURE 11 is illustrative of the winding operation of, for example, a low voltage induction coil 76, near its completion. FIGURES 13 and 15 illustrate a completed low voltage winding or coil 76 and FIGURE 14 illustrates a completed transformer winding having an inner low voltage coil 76 and an outer high voltage coil 77, as produced in accordance with the method and apparatus previously illustrated. The winding 77 is shown positioned on or separated from the winding 76 by a heavier or major thickness of insulating material layer e. FIGURE 16 shows a completed transformer winding having dual conductor layers a and a' in its low voltage coil 76'. For the purpose of illustration, I have shown high voltage coils 77 of spiral ribbon construction. However, depending on electrical requirements, an ordinary helical-wound, magna wire coil may be formed or wound about the low voltage winding 76 or 76'. It will be apparent that a type of winding of my invention is practically suited for the low voltage windings of transformers and other electrical induction apparatus.

In FIGURE 15, the insulating sheet material b is shown provided with a width slightly greater than the transverse width of the conductor layer a and as doubled-over along its opposite side edges to provide side or edge closures or strip d for the thickness spacing represented by the conductor layers a. Preferably, the payout coils or reels 70 and 71' will have such doubled-over edges preformed thereon, in order that the insulating sheet b may be applied simultaneously-continuously under tension to the tensioned conductor layers a during the winding operation. Where the thickness of the conductor layers is substantially greater than the thickness of the insulating sheet b, for example, when a dual or stacked ribbon layer group a and a' is employed, as in FIGURE 16, the side edge portions d' may employ adhesively-secured, separate fabric strips or the width of the material b may be increased in order to provide right angle (not complete) folds. Means, such as edge rollers or abutment pieces, may be provided (not shown) at the unit D along opposite sides of the mandrel 57 for automatically accomplishing the latter type of folding as the winding operation progresses.

Referring particularly to FIGURES 17 and 23, inclusive, suitable representative methods of providing lead-outs are illustrated. In FIGURES 17 and 18, adjacent ribbon lengths 20 and 22, inclusive, have their end portions folded-over obliquely to provide a stacked group 26 of lead-out connector tabs that are an integral part of such ribbons. In the same manner, adjacent ribbon lengths 23 to 25, inclusive, are folded-over obliquely to form a second stacked group 27 of lead-out connector tabs that are an integral part of their respective ribbons. When the ribbons 20 to 25, inclusive, are of copper metal, then the stacked tab groups 26 and 27 may be directly brazed or welded in parallel as a group to a suitable common copper bus bar, such as 84 of FIGURE 12, for the starting or inner end of a low voltage coil or winding 76. Similar terminal or outer stacked groups 28 and 29 (see FIGURE 12), may be directly brazed or weld-secured to a common copper bus bar, such as 85.

On the other hand, see FIGURES 12 and 22, if the ribbons of the layers are of aluminum, individual copper connector lead-out pieces or tabs in stacked groups 80 and 81 are directly brazed or weld-secured in parallel to bus bar 84 and stacked groups 82 and 83 are, in a like manner, secured in parallel to bus bar 85. FIGURES 22 to 24 illustrate a suitable type of secure and efficient electrical connection or joint 86 between the unlike metals, such as aluminum and copper, of a so-called high pressure, complementary-deforming type, designated as "Kold Welding." In this connection, each individual aluminum tab of a group will be thus individually secured (see FIGURE 24) to a copper piece or ribbon, and the copper pieces or ribbons of each stacked group will then be brazed or welded in a conventional manner directly to an associated bus bar. An outside connection from a coil is the preferable type, since it facilitates repair and maintenance, although if desired, an inside type of connection may be used as illustrated in FIGURE 21. As shown, pressure welds 86 may be applied inside directly to longitudinal, non-bent ends of the adjacent ribbon groups of the winding to connect transversely-extending copper lead-out groups of connecting portions or tabs 87 and 88 thereto. The tab groups 87 and 88 will then be electrically secured in parallel to a common bus bar, such as 84 of FIGURE 12. FIGURE 22, as distinguished from FIGURE 21, illustrates the type of lead-out connections shown in FIGURE 12 which are of an external type.

FIGURES 19 and 20 illustrate bent-over, integral lead-outs which have a common stacked group 26' for all the conductor ribbons of the layer. It will be noted that in the embodiment of FIGURES 17 and 18, one group of ribbons 27 has a longitudinally-spaced relation with the other group of ribbons 26, while in the embodiment of FIGURES 19 and 20, the end portions all are bent at the same longitudinal location to provide the common group 26'.

Although for the purpose of illustration, embodiments of the system, procedure and constructions have been shown, it will be apparent to those skilled in the art that various modifications and changes may be made in accordance with the invention and that coils constructed by the application of the invention can be used for other purposes, without departing from its spirit and scope as indicated by the appended claims.

I claim:

1. An electrical transformer having an inner low voltage coil and an outer high voltage coil wherein the low voltage coil has a central core window and comprises, spirally-continuous metal conductor layers in the form of conductor winding turns, said conductor layers having a group of edgewise-adjacent and abutting longitudinally-extending individual bare metal conductor ribbons, each ribbon providing a series electrical circuit, spiral insulating layers between the layers of the conductor winding turns, spacer means interposed at spaced locations along the winding between the conductor layers, means connecting individual conductor ribbons of the group at starting ends of an inner layer electrically in parallel, means connecting individual conductor ribbons of the group at terminating ends of an outer layer electrically in parallel, a high voltage coil about said low voltage coil and separated therefrom by an insulating layer, and said high voltage coil having insulated metal conductor windings wound thereon.

2. An electrical transformer as defined in claim 1 wherein the high voltage coil is of the same defined construction as the low voltage coil and has means connecting starting and terminating ends of the individual conductor ribbons of its inner and outer layers each electrically in parallel.

3. A transformer as defined in claim 2 wherein the low voltage coil also comprises, second spirally-continuous stacked metal conductor layers on the first-mentioned conductor layers, the second layers also having a group of edgewise-adjacent longitudinally-extending bare metal conductor ribbons, each of which rests in an abutting-stacked relation on and extends along a corresponding individual conductor ribbon of the group of the first-mentioned layers, and means electrically-connecting the individual conductor ribbons of the group of the second conductor layers in parallel with the individual conductor ribbons of the group of the first-mentioned layers at their respective terminating and starting ends.

4. In an economical spirally-wound electrical induction coil suitable for transformer utilization, spirally-continuous bare metal conductor layers in the form of a group of longitudinally-extending conductor ribbons of substantially rectangular section that have a transverse immediately adjacent edgewise abutting relation with respect to each other at each winding turn, a longitudinally-extending layer of insulating material at each winding turn upon which the group of ribbons rest, each of said conductor ribbons extending continuously-spirally in a longitudinally parallel edge-to-edge relation with adjacent ribbons along the turns of the winding to define a series electrical circuit, terminal ends of each of said conductor ribbons being electrically-connected to adjacent ends of said group of ribbons of the winding to provide parallel electrical circuit connections to the series electrical circuits of the winding represented by the individual conductor ribbons.

5. In an electrical induction coil as defined in claim 4, said insulating layer having a width greater than the total transverse width of said group of conductor ribbons, and having an increased thickness along its longitudinal edges that substantially corresponds to the thickness of adjacent conductor ribbons of said group.

6. In an electrical induction coil as defined in claim 4, each of said conductor ribbons of the group having a transverse width within a range of ½ an inch to 4 inches and a maximum thickness of below about ½ an inch.

7. In an electrical induction coil as defined in claim 4, each conductor ribbon of each winding turn being paired with a longitudinally-extending bare metal conductor ribbon of substantially rectangular section in a face-to-face abutting relation along the winding.

8. In an electrical induction coil as defined in claim 4, adjacent conductor ribbons of the group at an inner terminal end of said winding being folded to extend transversely-outwardly in an aligned stacked relation with each other for connection to a first bus bar, and adjacent conductor ribbons of the group at the outer terminal end of the winding being folded transversely-outwardly in an aligned stacked relation with each other for connection to a second bus bar.

9. In an electrical induction coil as defined in claim 4, said insulating layer having a greater width than the total transverse width of said group of conductor ribbons of the layer of each winding turn, and said insulating layer being bent-over along its outer longitudinal edge portions to close-off outer edge spacing between each conductor layer represented by the thickness of each layer between opposed turns of said insulating material.

References Cited

UNITED STATES PATENTS

| | | | |
|---|---|---|---|
| 901,299 | 10/1908 | Kitsee | 336—192 XR |
| 2,821,685 | 1/1958 | Whitehorn | 336—232 XR |
| 2,879,320 | 3/1959 | Staley et al. | 336—192 XR |
| 2,949,593 | 8/1960 | Staley et al. | 336—223 |
| 2,980,874 | 4/1961 | Tarbox | 336—192 |
| 3,102,245 | 8/1963 | Lawson | 336—205 XR |
| 3,153,216 | 10/1964 | Klitten | 336—223 |
| 3,237,136 | 2/1966 | Ford | 336—205 |
| 3,320,566 | 5/1967 | Lohman | 336—192 |

THOMAS J. KOZMA, Primary Examiner

U.S. Cl. X.R.

29—605; 336—192, 223, 206

PO-1050
(5/69)

UNITED STATES PATENT OFFICE
CERTIFICATE OF CORRECTION

Patent No. 3,495,202          Dated February 10, 1970

Inventor(s) Delbert R. Parker

It is certified that error appears in the above-identified patent and that said Letters Patent are hereby corrected as shown below:

Column 5, line 23, correct the spelling of "material"; line 37, change "a ninch" to --an inch--.

Column 6, line 62, change "spaced" to --spacer--.

Column 10, line 20, change "71' " to --70'--.

SIGNED AND
SEALED
JUN 23 1970

(SEAL)
Attest:

Edward M. Fletcher, Jr.
Attesting Officer

WILLIAM E. SCHUYLER, JR.
Commissioner of Patents